Patented Dec. 13, 1927.

1,652,753

UNITED STATES PATENT OFFICE.

JOSEPH BRESLAUER AND CHARLES GOUDET, OF GENEVA, SWITZERLAND, ASSIGNORS TO SOCIÉTÉ D'ETUDES CHIMIQUES POUR L'INDUSTRIE, OF GENEVA, SWITZERLAND, A CORPORATION OF SWITZERLAND.

PROCESS FOR THE MANUFACTURE FROM CYANAMIDE OF MANURES CONTAINING SOLUBLE ORGANIC NITROGEN.

No Drawing. Application filed May 12, 1923, Serial No. 638,659, and in Switzerland May 15, 1922.

As is already known the calcium compound of cyanamide in presence of water and catalytic agents is more or less completely converted into urea which according to the working conditions contains variable amounts of polymers and derivatives of cyanamide which are noxious to plants.

The best results hitherto obtained by the use of mineral acids, for instance sulphuric acid, which in a quantity of 20 to 100 per cent of that theoretically necessary for combining all of the urea, have been used alone or with metallic compounds which act as catalytic agents.

This method however is unnecessarily expensive owing to the great amount of material used, and has furthermore the disadvantage that the metallic catalytic agents must be removed at the end of the reaction. This removal is often very difficult and causes further unnecessary costs.

The present invention relates to a process by which these disadvantages are overcome and in the practice of which products are obtained which can be used, in the form in which they are obtained, for agricultural purposes.

According to the invention porous bodies such as for instance turf or peat, clay, volcanic ashes such as pozzolana, and any humic porous material, that is material containing humic acid, are mixed with a highly concentrated solution of cyanamide, which is obtained in any well known manner from calcium cyanamide. The mixture thus obtained is subjected to the action of atmospheric air, or better it is heated preferably in an autoclave under a pressure of carbonic acid, nitrogen or air and oxygen, which pressure may vary between 5 and 25 atmospheres at temperatures which do not exceed 120 degrees centigrade, and may advantageously vary between 60 and 90 degrees centigrade depending upon the results to be obtained.

By this method it has for instance been possible in using peat or turf to convert almost the entire quantity of the nitrogen present into urea-nitrogen which is determined by xanthydrol, while the rest of the nitrogen, after the reaction, may remain mainly in the form of ammonia or, when oxygen or air have been used, in the form of nitrates, the final product containing no trace of cyanamide, dicyandiamide or dicyandiamidine. The duration of such a conversion varies between several hours and several days depending upon the character of the porous body and the temperature employed.

This fact is very interesting as it is in contradiction with all observations which have hitherto been made in this matter and according to which the cyanamide in presence of peat or turf is converted in urea in very small quantities (see "Bulletin Mensuel de Renseignements Agricoles", September 1921, page 1198, G. A. Cowie).

When peat or turf is employed, the manure finally obtained may be used after a simple drying in the air and also contains all the nitrogen of the peat or turf, which generally is lost. It offers all the other advantages of very porous substances with a large surface and a considerable absorption-power. It contains the vitamines present in the peat or turf and, when it has been prepared under carbonic acid pressure, owing to its porosity a great amount of this gas, the manuring properties of which are well known is included therein.

It is also possible to vary the final composition of the product by regulating the temperature; the raising of the temperature favors the formation of ammonia at the cost of the urea. But in this case the addition of acid substances is advisable for binding the ammonia which could only partially be neutralized by the humic acids of the peat or turf and should be collected as such.

The advantages offered by the present invention are clear, especially because it has been found, that by repeating the process it is possible to vary as desired and in a large amount the content in nitrogen of the final product.

Instead of working in an atmosphere of carbonic acid it is also possible to work, as hereinbefore stated, in an atmosphere of nitrogen and oxygen. In the latter case a portion of the nitrogen is converted into oxygenic compounds.

It is further possible to employ the well known properties of the peat or turf, which have already been used for the manufacture of nitre-beds. The described application of the peat or turf offers considerable interest especially in countries which are rich in peat and where suitable processes for using this peat are always in demand. By converting a part of the peat into cokes, the latter may be used for the manufacture of carbide, calcium cyanamide and its derivatives. For this purpose thermic central power houses may be built on the peat-mosses and the carbonic acid of the combustion gases may be employed after previous enrichment in a well known manner for decomposing the calcium cyanamide and for the manufacture of the manures hereinbefore described.

The peat or turf mosses furnish therefore all materials which are necessary for the cycle of operations which compose the present process, except the lime (Ca(OH)$_2$) which alone needs to be furnished. But it must be remembered that the decomposition of the calcium cyanamide by means of carbonic acid produces a mixture of calcium carbonate and carbon, from which mixture at least a great portion of the necessary lime may be recovered and again used for the manufacture of carbide.

It will be understood that in the practice of the invention hereinbefore described the use of peat or turf or any porous material containing humic acid may be employed where it is found that the same may be advantageously used.

We claim as our invention—

1. A process for the manufacture from cyanamide of a fertilizer containing soluble organic nitrogen especially in the form of urea, consisting in treating material composed of humic porous substances under the action of heat for at least one hour, which substances act as both chemical and physical catalyzers, with a solution of cyanamide which is obtained from calcium cyanamide, and in drying the mixture thus obtained.

2. A process for the manufacture from cyanamide of a fertilizer containing soluble organic nitrogen especially in the form of urea, consisting in treating peat under the action of heat for at least one hour with a solution of cyanamide which is obtained from calcium cyanamide, and in drying the mixture thus obtained.

3. A process for the manufacture from cyanamide of a fertilizer containing soluble organic nitrogen especially in the form of urea, consisting in treating humic porous material for at least one hour, which material acts as both chemical and physical catalyzers, with a solution of cyanamide which is obtained from calcium cyanamide, and in heating the mixture under a pressure between 5 and 25 atmospheres.

4. A process for the manufacture from cyanamide of a fertilizer containing soluble organic nitrogen especially in the form of urea, consisting in treating humic porous material for at least one hour, which material acts as both chemical and physical catalyzers, with a solution of cyanamide which is obtained from calcium cyanamide, and in heating the mixture under a pressure between 5 and 25 atmospheres at a temperature between 60 and 120 degrees centigrade.

5. A process for the manufacture from cyanamide of a fertilizer containing soluble organic nitrogen especially in the form of urea, consisting in treating peat for at least one hour, with a solution of cyanamide which is obtained from calcium cyanamide, and in heating the mixture in an atmosphere of carbon dioxide under a pressure between 5 and 25 atmospheres and at a temparature between 60 and 120 degrees centigrade, and in drying the mixture thus obtained.

6. A process for the manufacture from cyanamide of a fertilizer containing soluble organic nitrogen especially in the form of urea, consisting in treating peat for at least one hour, with a solution of cyanamide which is obtained from calcium cyanamide and in heating the mixture in an atmosphere of carbon dioxide under a pressure between 5 and 25 atmospheres and at a temperature between 60 and 120 degrees centigrade, drying the mixture thus obtained, and then treating the dried peat manure thus obtained with a solution of cyanamide for the purpose of increasing the nitrogen concentration of the final product.

In testimony whereof we have affixed our signatures.

JOSEPH BRESLAUER.
CHARLES GOUDET.